(12) United States Patent
Wang et al.

(10) Patent No.: US 9,742,549 B1
(45) Date of Patent: Aug. 22, 2017

(54) APPARATUS AND METHODS FOR ASYNCHRONOUS CLOCK MAPPING

(71) Applicant: Analog Devices Global, Hamilton (BM)

(72) Inventors: Yi Wang, Reidsville, NC (US); Yiming Zhao, Beijing (CN); Xiaopeng Song, Beijing (CN)

(73) Assignee: Analog Devices Global, Hamilton (BB)

( * ) Notice: Subject to any disclaimer, the term of this patent is extended or adjusted under 35 U.S.C. 154(b) by 0 days.

(21) Appl. No.: 15/279,976

(22) Filed: Sep. 29, 2016

(51) Int. Cl.
*H04L 7/00* (2006.01)
*H04L 7/033* (2006.01)
*H04L 29/06* (2006.01)

(52) U.S. Cl.
CPC .......... *H04L 7/0012* (2013.01); *H04L 7/0331* (2013.01); *H04L 67/42* (2013.01)

(58) Field of Classification Search
CPC . H04L 5/24; H04L 7/044; H04L 25/38; H04L 7/0008; G06F 13/385
USPC .................................................. 375/354–376
See application file for complete search history.

(56) References Cited

U.S. PATENT DOCUMENTS

| | | | | |
|---|---|---|---|---|
| 5,926,515 | A * | 7/1999 | Park ........................ | H03L 7/10 331/25 |
| 7,206,367 | B1 * | 4/2007 | Moore .................... | H04L 12/66 348/515 |
| 7,447,931 | B1 * | 11/2008 | Rischar ................. | H04J 3/0697 368/46 |
| 7,630,468 | B2 * | 12/2009 | Miller ...................... | H03L 7/07 327/147 |
| 7,643,599 | B2 * | 1/2010 | Willis .................. | H03D 13/003 327/12 |
| 7,656,985 | B1 * | 2/2010 | Aweya .................... | H03L 7/093 331/16 |
| 7,831,005 | B2 * | 11/2010 | Kuwata ................. | H04J 3/0608 375/371 |
| 7,885,367 | B2 * | 2/2011 | Nishimura .............. | H04L 7/048 327/144 |
| 7,912,161 | B2 * | 3/2011 | Nicolescu ......... | H04L 25/03057 375/233 |
| 7,974,375 | B2 * | 7/2011 | Kim ....................... | H03L 7/087 327/235 |

(Continued)

OTHER PUBLICATIONS

International Telecommunication Union, Interfaces for the Optical Transport Network, Recommendation ITU-T G.709/Y.1331, Feb. 2012, in 238 pages.

(Continued)

*Primary Examiner* — James M Perez
(74) *Attorney, Agent, or Firm* — Knobbe, Martens, Martens, Olson & Bear LLP

(57) ABSTRACT

Apparatus and methods for asynchronous clock mapping are provided herein. In certain configurations, an upstream server of a transport network generates clock difference data indicating a time difference between a server clock signal and a client clock signal, which have an asynchronous timing relationship with respect to one another. The clock difference data is generated with high precision by using one or more time-to-digital converters (TDCs). The clock difference data is included in a transmitted data stream, and is used by a downstream server to recover client information with enhanced accuracy.

20 Claims, 7 Drawing Sheets

(56) References Cited

U.S. PATENT DOCUMENTS

| | | | | |
|---|---|---|---|---|
| 8,209,699 B2* | 6/2012 | Ferguson | G06F 17/30362 | 707/704 |
| 8,358,729 B2* | 1/2013 | Bae | H03L 7/0891 | 327/155 |
| 8,391,436 B2* | 3/2013 | Higeta | H03K 5/1534 | 375/317 |
| 8,416,812 B2* | 4/2013 | Radulescu | G04G 7/00 | 370/503 |
| 8,625,641 B2* | 1/2014 | Liang | H04J 3/0697 | 370/503 |
| 8,643,696 B2* | 2/2014 | Kee | H04N 21/242 | 348/14.08 |
| 8,693,608 B2* | 4/2014 | Hadzic | H04L 7/033 | 375/350 |
| 8,902,932 B2* | 12/2014 | Belhadj | H04J 3/0667 | 370/503 |
| 8,917,759 B2* | 12/2014 | Xu | H04L 27/2272 | 375/214 |
| 9,331,804 B2* | 5/2016 | Wong | H04J 3/0638 | |
| 9,374,141 B2* | 6/2016 | Murakami | H04B 7/04 | |
| 9,413,418 B2* | 8/2016 | Bottazzi | H04B 7/04 | |
| 9,560,060 B2* | 1/2017 | Baxley | H04L 63/1416 | |
| 9,577,817 B2* | 2/2017 | Yun | H04L 7/0008 | |
| 2002/0178178 A1* | 11/2002 | Peng | G06F 17/30902 | |
| 2006/0269029 A1* | 11/2006 | Repko | H04J 3/0664 | 375/356 |
| 2008/0075122 A1* | 3/2008 | Fourcand | H04J 3/0605 | 370/503 |
| 2008/0080562 A1* | 4/2008 | Burch | H04J 3/0667 | 370/503 |
| 2008/0215264 A1* | 9/2008 | Spanier | G01R 19/2509 | 702/62 |
| 2009/0041104 A1* | 2/2009 | Bogdan | H03K 5/15013 | 375/226 |
| 2009/0116597 A1* | 5/2009 | Cortadella | H03K 19/20 | 375/354 |
| 2009/0276542 A1* | 11/2009 | Aweya | H04J 3/0667 | 709/248 |
| 2010/0085989 A1* | 4/2010 | Belhadj | H04J 3/0667 | 370/503 |
| 2010/0100759 A1* | 4/2010 | Blixt | G06F 1/14 | 713/502 |
| 2010/0135334 A1* | 6/2010 | Briscoe | H04J 3/0664 | 370/503 |
| 2011/0029498 A1* | 2/2011 | Ferguson | G06F 17/30362 | 707/703 |
| 2011/0032013 A1* | 2/2011 | Nelson | B60Q 1/444 | 327/156 |
| 2011/0080985 A1* | 4/2011 | Secker | H03L 7/18 | 375/376 |
| 2011/0150005 A1* | 6/2011 | Chen | H04J 3/0667 | 370/503 |
| 2011/0158120 A1* | 6/2011 | Hamasaki | H04J 3/0641 | 370/252 |
| 2011/0274149 A1* | 11/2011 | Xu | H04J 3/0638 | 375/222 |
| 2012/0069943 A1* | 3/2012 | Lim | H04J 3/0641 | 375/371 |
| 2012/0087402 A1* | 4/2012 | Patoine | H04J 3/0697 | 375/226 |
| 2012/0182383 A1* | 7/2012 | Kee | H04N 21/242 | 348/14.08 |
| 2012/0195253 A1* | 8/2012 | Irvine | H04J 3/0641 | 370/328 |
| 2012/0288280 A1* | 11/2012 | Sui | H04J 3/0655 | 398/66 |
| 2013/0013951 A1* | 1/2013 | Gotz | G04G 7/00 | 713/400 |
| 2013/0034197 A1* | 2/2013 | Aweya | H04J 3/0664 | 375/362 |
| 2013/0163618 A1* | 6/2013 | Sergeev | H04J 3/0667 | 370/503 |
| 2014/0067777 A1* | 3/2014 | Lewis | G06F 17/30289 | 707/693 |
| 2014/0119390 A1* | 5/2014 | Rabinovich | H04L 43/0852 | 370/503 |
| 2014/0226648 A1* | 8/2014 | Xing | H04W 56/001 | 370/350 |
| 2014/0254735 A1* | 9/2014 | Nemawarkar | H04L 7/0331 | 375/376 |
| 2014/0348278 A1* | 11/2014 | Wong | H04J 3/0638 | 375/355 |
| 2016/0315830 A1* | 10/2016 | Cote | H04L 47/52 | |
| 2017/0048247 A1* | 2/2017 | Das | G06F 17/30896 | |

OTHER PUBLICATIONS

Analog Devices, Inc. "AD9554 Quad PLL, Quad Input, Multiservice Line Card Adaptive Clock Translator", Analog Devices Datasheet, Rev. B, Retrieved Online PDF Signature Dated Jun. 2, 2016, 116 pages.

* cited by examiner

APPARATUS AND METHODS FOR ASYNCHRONOUS CLOCK MAPPING

FIELD OF THE DISCLOSURE

Embodiments of the invention relate to electronic systems, and more particularly to, asynchronous clock mapping in a transport network.

BACKGROUND

Transport networks can be used for communicating data between network nodes that can be separated by a relatively long distance. For example, an upstream node can receive and process client clock and data signals, which can be transported to a downstream node via a communication link.

Transport networks can include optical networks operating over fiber-optic links that provide optical channel transport and multiplexing. Transport networks can be used, for example, to transport client data in metro, long-haul, and/or multilayer networking applications.

SUMMARY OF THE DISCLOSURE

Apparatus and methods for asynchronous clock mapping are provided herein. In certain configurations, an upstream server of a transport network generates clock difference data indicating a time difference between a server clock signal and a client clock signal, which have an asynchronous timing relationship with respect to one another. The clock difference data is generated with high precision by using one or more time-to-digital converters (TDCs). The clock difference data is included in a transmitted data stream, and is used by a downstream server to recover client information with enhanced accuracy.

One aspect of this disclosure is a server for transmitting data over a transport network. The server includes a clock generator, a mapping circuit, and a clock difference calculation circuit. The clock generator is configured to generate a server clock signal. The mapping circuit is configured to receive a client data signal and a client clock signal that is asynchronous with respect to the server clock signal. The mapping circuit is also configured to map the client clock signal and the client data signal into a server data stream based on timing of the server clock signal. The clock difference calculation circuit includes at least one time-to-digital converter (TDC), and the TDC is configured to generate clock difference data. The clock difference data includes a digital representation of a time difference between the server clock signal and the client clock signal. The mapping circuit is further configured to insert the clock difference data into the server data stream.

In certain configurations, the server data stream includes a frame, wherein the mapping circuit is configured to include the clock difference data in an overhead portion of the frame. In certain implementations, the clock difference calculation circuit measures the time difference between the server clock signal and the client clock signal over about a time period of the frame. In some configurations, the clock difference calculation circuit includes a scaling unit configured to scale the clock difference data by a scale factor.

In certain implementations, the at least one TDC includes a first TDC and a second TDC. In certain configurations, the first TDC generates a first plurality of digital timestamps representing a plurality of transitions of the client clock signal, and the second TDC generates a second plurality of digital timestamps representing a plurality of transitions of the server clock signal.

In certain configurations, the clock difference calculation circuit is further configured to generate the clock difference data based on aggregating a difference between the first plurality of the timestamps and the second plurality of timestamps. In certain implementations, the clock difference calculation circuit includes a phase-locked loop, and the first TDC operates in the phase-locked loop.

In certain implementations, the clock difference calculation circuit is configured to generate an output clock signal based on the client clock signal. In certain configurations, the mapping circuit includes a protocol mapper configured to provide a bit-synchronous mapping of the client data signal from a time domain of the client clock signal to a time domain of the output clock signal.

In certain configurations, the mapping circuit includes an asynchronous mapping buffer and a buffer read control circuit. In certain implementations, the asynchronous mapping buffer generates a buffered data signal based on asynchronously mapping the client data signal, and the buffer read control circuit generates the server data stream based on the buffered data signal, the clock difference data, and the timing of the server clock signal.

In another aspect an asynchronous clock mapping circuit includes a clock difference calculation circuit and a mapping circuit. The clock difference calculation circuit includes at least one time-to-digital converter (TDC) configured to generate clock difference data including a digital representation of a time difference between a server clock signal and a client clock signal. The mapping circuit is configured to generate a server data stream based on asynchronously mapping a client data signal from a time domain of the client clock signal to a time domain of the server clock signal. The mapping circuit is further configured to insert the clock difference data into the server data stream.

In certain configurations, the server data stream includes a frame, wherein the mapping circuit is configured to include the clock difference data in an overhead portion of the frame. In certain implementations, the clock difference calculation circuit measures the time difference between the server clock signal and the client clock signal over about a time period of the frame. In certain configurations, the clock difference calculation circuit includes a scaling unit configured to scale the clock difference data by a scale factor.

In certain implementations the at least one TDC includes a first TDC that generates a first plurality of digital timestamps representing a plurality of transitions of the client clock signal, and a second TDC that generates a second plurality of digital timestamps representing a plurality of transitions of the server clock signal.

In certain configurations, the clock difference calculation circuit is further configured to generate the clock difference data based on aggregating a difference between the first plurality of the timestamps and the second plurality of timestamps. In certain implementations, the clock difference calculation circuit includes a phase-locked loop, wherein the first TDC operates in the phase-locked loop. In certain configurations, the clock difference calculation circuit is configured to generate an output clock signal based on the client clock signal, and the mapping circuit includes a protocol mapper configured to provide a bit-synchronous mapping of the client data signal from a time domain of the client clock signal to a time domain of the output clock signal.

In certain implementations, the mapping circuit includes an asynchronous mapping buffer and a buffer read control circuit. In certain configurations, the asynchronous mapping buffer generates a buffered data signal based on asynchronously mapping the client data signal; and the buffer read control circuit generates the server data stream based on the buffered data signal, the clock difference data, and the timing of the server clock signal.

In another aspect, a method of method of transporting data over a transport network includes generating clock difference data, generating a server data stream, and inserting a clock difference data into the server data stream for transmission downstream. The clock difference data includes a digital representation of a time difference between a server clock signal and a client clock signal using at least one time-to-digital converter (TDC); and the server data stream is based on asynchronously mapping a client data signal from a time domain of the client clock signal to a time domain of the server clock signal.

BRIEF DESCRIPTION OF THE DRAWINGS

These drawings and the associated description herein are provided to illustrate specific embodiments of the invention and are not intended to be limiting.

DETAILED DESCRIPTION

Figure 1:
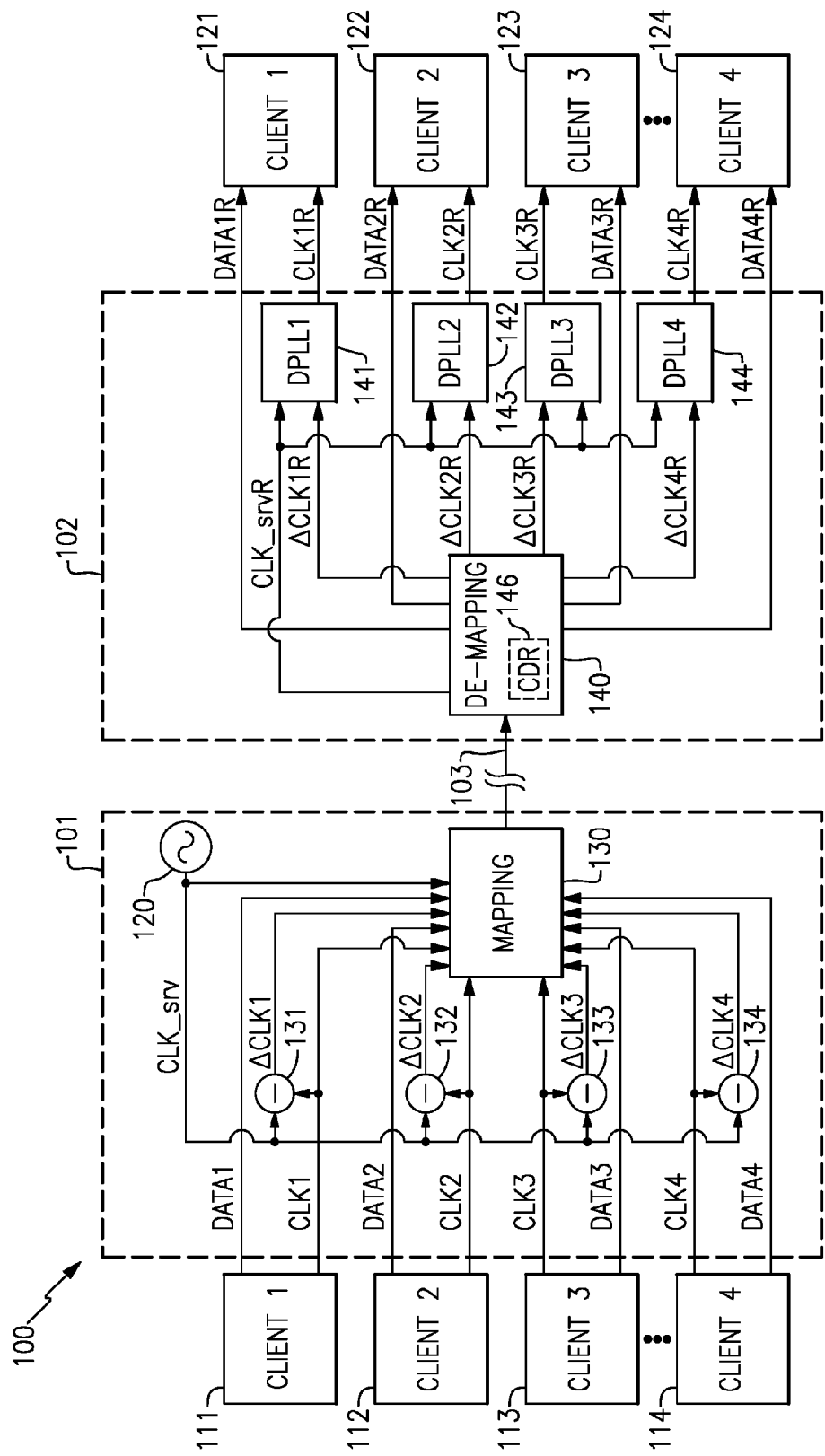
FIG. 1 is a schematic diagram of a transport network according to one embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A transport network can be used to transport multiple client clock and data signals from an upstream server to a downstream server over a communication link. Since a particular client clock signal can operate asynchronously with respect to the upstream server's clock signal, a mapper of the upstream server retimes client information to a time domain of the upstream server. Additionally, the upstream server transmits a server data stream via the communication link to the downstream server, which processes the server data stream to recover the client clock and data signals. For instance, the server data stream can include frames of data that are de-mapped by the downstream server to recover client clock and data signals.

Transport networks can provide relatively robust error correction, and can be used to transport client information associated with a wide variety of communication protocols. Additionally, transport networks can be used for communicating over relatively long distances, including, for instance, distances greater than about 1,000 miles. Examples of transport networks include, but are not limited to, Optical Transport Network (OTN), Packet Transport Network (PTN), Synchronous Digital Hierarchy (SDH) and Synchronous Optical Network (SONET).

In a transport network, it can be desirable for the client clock and data signals to be transparently transmitted downstream. For example, it is desirable for recovered client clock and data signals at the downstream server to be substantially identical to clock and data signals received by the upstream server. Transporting client clock and data signals downstream with transparency maintains the integrity of the transmitted client information. However, an asynchronous timing relationship between a client clock signal and a server clock signal can complicate transmission of client information over a transport network.

Apparatus and methods for asynchronous clock mapping are provided herein. In certain configurations, a server for transmitting client clock and data signals over a transport network is provided. The server includes a clock generator that generates a server clock signal, a mapping circuit that maps a client clock signal and a client data signal into a server data stream based on timing of the server clock signal, and a clock difference calculation circuit including at least one time-to-digital converter (TDC) used to generate clock difference data corresponding to a digital representation of a time difference between the server clock signal and the client clock signal. The mapping circuit inserts the clock difference data into the server data stream, which is processed downstream to enhance accuracy of recovered client clock and data signals.

Thus, a TDC-based clock difference calculation circuit on a mapping side of the transport network is used to measure a clock time difference between a server clock signal and a client clock signal, which operate asynchronously with respect to one another. By using at least one TDC to measure a time difference between the asynchronous clock signals, the clock difference can be represented with relatively high precision, and thus client clock and data signals can be accurately recovered on a de-mapping side of the transport network.

For example, a downstream server on the de-mapping side can recover a server clock signal and a server data signal from the server data stream using clock and data recovery (CDR) techniques. Additionally, both the client data signal and the clock difference data can be recovered from the server data signal. Additionally, the client clock signal can be reconstructed based on adjusting timing of the recovered server clock signal based on the clock difference data. Since the clock difference data digitally represents the clock difference with a relatively high precision, recovery of client clock and data signals is enhanced. Thus, client information can be reliably transported in a transport network with integrity at high speeds and/or with wide bandwidth.

Clock difference data can be regularly sent from the upstream server to the downstream server. In certain implementations, the clock difference data is periodically transmitted downstream, such as in an overhead portion of each frame that is transported via the server data stream. For example, a particular frame that is transported can represent clock and data signals of a particular client, and the overhead portion of the frame can include clock difference data associated with a time difference between that particular client's clock signal and the upstream server's clock signal. However, other implementations are possible.

In certain configurations, a digital proportion transformation is provided to the clock difference data prior to insertion into the server data stream. Using a proportion transformation helps provide the clock difference data on a desired time scale, thereby providing more accurate downstream recovery of client clock and data signals.

FIG. 1 is a schematic diagram of a transport network 100 according to one embodiment. The transport network 100 includes an upstream server 101, a downstream server 102 and a communication link 103. Although illustrated as including two servers and one communication link, the transport network typically includes additional servers and communication links.

The upstream server 101 receives clock and data signals from multiple clients, and processes the client clock and data signals to generate a server data stream that is transmitted to the downstream server 102 via the communication link 103.

For clarity of the figures, FIG. 1 illustrates unidirectional transmission of client information from the upstream server 101 to the downstream server 102. However, both the server 101 and the server 102 can transmit data to and receive data from one another over the same and/or different communication link. Such details are omitted from FIG. 1 for clarity.

In the illustrated embodiment, the upstream server 101 receives a first client data signal DATA1 and a first client clock signal CLK1 from a first upstream client 111. Additionally, the upstream server 101 receives a second client data signal DATA2 and a second client clock signal CLK2 from a second upstream client 112, a third client data signal DATA3 and a third client clock signal CLK3 from a third upstream client 113, and a fourth client data signal DATA4 and a fourth client clock signal CLK4 from a fourth upstream client 114.

Although the upstream server 101 is illustrated as receiving client clock and data signals from four clients, the teachings herein are applicable to configurations in which data is received from more or fewer clients. The clients can provide clock and data signals of a wide variety of types.

In one embodiment, the transport network 100 is implemented as an Optical Transport Network (OTN), which can be used for communication of, for example, base station information, Synchronous Optical Networking (SONET)/Synchronous Digital Hierarchy (SDH) information, packet/internet protocol (IP) information, or a combination thereof. In such an embodiment, the communication link 103 can correspond to an optical fiber, including, but not limited to, an undersea cable. However, the teachings herein are applicable to a wide variety of transport networks, including, for example, transport networks operating using electrical cables.

The information provided by a particular client can be represented using a corresponding pair of client clock and data signals. To main the integrity of signals transported via the transport network 100, it is desirable for the client and data signals to be transported transparently through the transport network 100. For example, it is desirable for the client clock and data signals recovered by the downstream server 102 to be substantially identical to the client clock and data signals received by the upstream server 101.

The illustrated upstream server 101 includes a clock generator 120, a mapping circuit 130, a first TDC-based clock difference calculation circuit 131, a second TDC-based clock difference calculation circuit 132, a third TDC-based clock difference calculation circuit 133, and a fourth TDC-based clock difference calculation circuit 134. As shown in FIG. 1, the clock generator 120 generates a server clock signal CLK_srv, which is provided to the mapping circuit 130 and to each of the TDC-based clock difference calculation circuits 131-134.

The TDC-based clock difference calculation circuits 131-134 are used to generate clock difference data that digitally represents a difference in time between the server clock signal CLK_srv and a particular client clock signal. For example, the first TDC-based clock difference calculation circuit 131 generates first clock difference data ΔCLK1, which represents the time difference between the server clock signal CLK_srv and the first client clock signal CLK1. The first clock difference data ΔCLK1 includes multiple bits of digital data, for instance, a number of bits in the range of 10 bits to about 80 bits.

Similarly, the second TDC-based clock difference calculation circuit 132 generates second clock difference data ΔCLK2 based on measuring the time difference between the server clock signal CLK_srv and the second client clock signal CLK2, the third TDC-based clock difference calculation circuit 133 generates third clock difference data ΔCLK3 based on measuring the time difference between the server clock signal CLK_srv and the third client clock signal CLK3, and the fourth TDC-based clock difference calculation circuit 134 generates fourth clock difference data ΔCLK4 based on measuring the time difference between the server clock signal CLK_srv and the fourth client clock signal CLK4.

The TDC-based clock difference calculation circuits 131-134 generate the clock difference data using at least one TDC. By using one or more TDCs to measure a time difference between the server clock signal CLK_srv and a corresponding client clock signal, the clock difference can be represented with relatively high precision, and thus client clock and data signals can be accurately recovered downstream in the transport network 100.

The mapping circuit 130 receives the client clock and data signals, as well as the clock difference data generated by the TDC-based clock difference calculation circuits 131-134. The mapping circuit 130 maps the client clock and data signals into the server data stream based on timing of the server clock signal CLK_srv. Additionally, the mapping circuit 130 inserts the clock difference data into the server data stream. The server data stream is, in turn, transmitted to the downstream server 102 via the communication link 103.

In certain configurations, the server data stream includes a string of serial data bits or symbols that transition at a data rate. At a given data rate, the server data stream has a unit interval, or minimum time interval between transitions of the server data stream. The transitions of the server data stream and corresponding unit interval are based on timing of the server clock signal CLK_srv. Thus, the server data stream includes information representing both server data and clock signals. In certain implementations, the server data stream is modulated and/or encoded, and the downstream server 102 demodulates and/or decodes the server data stream.

The illustrated downstream server 102 includes a de-mapping circuit 140, a first digital phase-locked loop (DPLL) 141, a second DPLL 142, a third DPLL 143, and a fourth DPLL 144.

As shown in FIG. 1, the de-mapping circuit 140 includes a CDR circuit 146, which processes the server data stream to recover server clock and data information. When the CDR circuit 146 is locked to the server data stream, the CDR circuit 146 can capture samples corresponding to bits of data transmitted by the upstream server 101 via the server data stream. For example, the samples taken by the CDR circuit 146 can include data samples taken from about the middle of the unit interval, thereby recovering server data transmitted from the upstream server 101. Since the unit interval of the server data stream is based on timing of the upstream server's clock signal, the CDR circuit 146 also recovers the server clock signal CLK_srv by observing timing of transitions in the server data stream.

The de-mapping circuit 140 processes the server data stream to generate a recovered server clock signal CLK_srvR, a first recovered client data signal DATA1R, a second recovered client data signal DATA2R, a third recovered client data signal DATA3R, a fourth recovered client data signal DATA4R, first recovered clock difference data ΔCLK1R, second recovered clock difference data ΔCLK2R, third recovered clock difference data ΔCLK3R, and fourth recovered clock difference data ΔCLK4R.

In the illustrated embodiment, the downstream server 102 includes phase-locked loops (PLLs) used to recover a client clock signal based on the recovered server clock signal CLK_srvR and corresponding clock difference data. For example, the recovered server clock signal CLK_srvR can serve as a reference clock signal to a particular PLL, and a phase and/or frequency of an output clock signal of the PLL can be adjusted based on a value of the clock difference data.

In the illustrated embodiment, the first DPLL 141 generates a first recovered client clock signal CLK1R by adjusting timing of the recovered server clock signal CLK_srvR based on the first recovered clock difference data ΔCLK1R. Additionally, the second DPLL 142 generates a second recovered client clock signal CLK2R by adjusting timing of the recovered server clock signal CLK_srvR based on the second recovered clock difference data ΔCLK2R. Furthermore, the third DPLL 143 generates a third recovered client clock signal CLK3R by adjusting timing of the recovered server clock signal CLK_srvR based on the third recovered clock difference data ΔCLK3R. Additionally, the fourth DPLL 144 generates a fourth recovered client clock signal CLK4R by adjusting timing of the recovered server clock signal CLK_srvR based on the fourth recovered clock difference data ΔCLK4R.

Although the illustrated embodiment uses digital phase-locked loops to recover client clock signals from client data signals, other implementations of recovering client clock signals based on clock difference data are possible.

As shown in FIG. 1, the downstream server 102 provides the first recovered data signal DATA1R and the first recovered clock signal CLK1R to a first downstream client 121. Additionally, the downstream server 102 provides the second recovered data signal DATA2R and the second recovered clock signal CLK2R to a second downstream client 122. Furthermore, the downstream server 102 provides the third recovered data signal DATA3R and the third recovered clock signal CLK3R to a third downstream client 123. Additionally, the downstream server 102 provides the fourth recovered data signal DATA4R and the fourth recovered clock signal CLK4R to a fourth downstream client 124.

The transport network 100 of FIG. 1 uses TDC-based clock difference calculation circuits 131-134 to generate clock difference data. The clock difference data digitally represents a time difference between the server clock signal CLK_srv and a corresponding client clock signal, and is transmitted downstream and used in recovering the client clock signal. By using one or more TDCs to measure a time difference between the asynchronous server and client clock signals, the clock difference can be represented with relatively high precision, and thus client clock and data signals can be accurately recovered.

Although FIG. 1 illustrates one embodiment of a transport network using TDC-based clock difference calculation, the teachings herein are applicable to transport networks implemented in a wide variety of ways. Accordingly, other implementations of transport networks can be used in accordance with the teachings herein.

Figure 2:
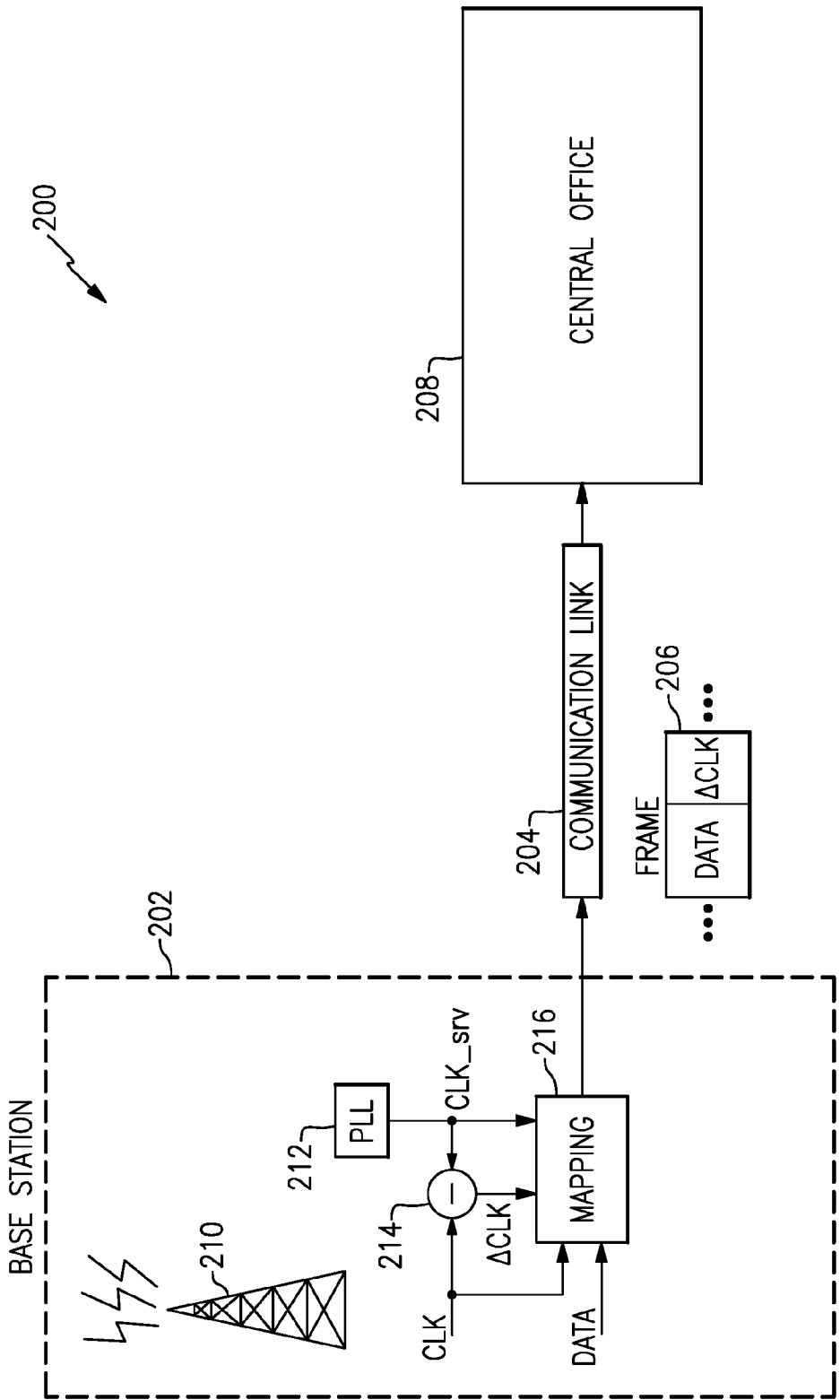
FIG. 2 is a schematic diagram of a transport network according to another embodiment.

FIG. 2 is a schematic diagram of a transport network 200 according to another embodiment. The transport network 200 includes a base station 202, a central office 208, and a communication link 204.

The base station 202 includes a tower 210, a PLL 212, a TDC-based clock difference calculation circuit 214, and a mapping circuit 216. The base station 202 receives a client clock signal CLK and a client data signal DATA, which represent information received via wireless communications of the tower's antennas. Although one set of client clock and data signals is illustrated in FIG. 2, the base station 202 can receive clock and data signals from multiple clients.

In the illustrated embodiment, the PLL 212 generates a server clock signal CLK_srv, which is provided to the mapping circuit 216 and the TDC-based clock difference calculation circuit 214. The TDC-based clock difference calculation circuit 214 measures a time difference between the server clock signal CLK_srv and the client clock signal CLK, and generates clock difference data ΔCLK that digitally represents the time difference. The mapping circuit 216 maps the client clock signal CLK and the client data signal DATA into a server data stream based on timing of the server clock signal CLK_srv. Additionally, the mapping circuit 216 inserts the clock difference data ΔCLK into the server data stream.

In the illustrated embodiment, the server data stream includes frames, such as the frame 206. The frame 206 includes a first portion of bits representing the client data signal DATA and a second portion of bits representing the clock difference data ΔCLK. Although the frame 206 is illustrated as including two portions of bits, the frame 206 can include additional portions of bits, including, but not limited to, bit portions used for identification, alignment, monitoring, and/or error correction.

The central office 208 receives the server data stream via the communication link 204. The central office 208 processes the server data stream to recover server clock and data including the clock difference data ΔCLK. The central office 208 uses the clock difference data ΔCLK to enhance accuracy of a recovered client clock signal. The clock difference data ΔCLK also compensates for instability and/or inaccuracy in the server clock signal CLK_srv and/or the client clock signal CLK.

As shown in FIG. 2, the clock difference data is included in overhead of frames transported downstream. Thus, the TDC-based clock difference calculation circuit 214 measures the time difference between a client clock signal and a server clock signal, and the clock difference data is transported downstream by way of, for instance, overhead bits. Additionally, downstream in de-mapping circuitry, the server clock and data are recovered using a CDR circuit. Additionally, client clock and data are recovered using the server clock and data signals and the clock difference data ΔCLK obtained from the server data stream.

In one embodiment, the transport network 200 is implemented as an OTN network. Additionally, the client data signal DATA is transported downstream via an optical payload unit (OPU) of the frame, and the clock difference data ΔCLK is transported via frame overhead.

Additional details of the transport network 200 of FIG. 2 can be as described earlier.

Figure 3:
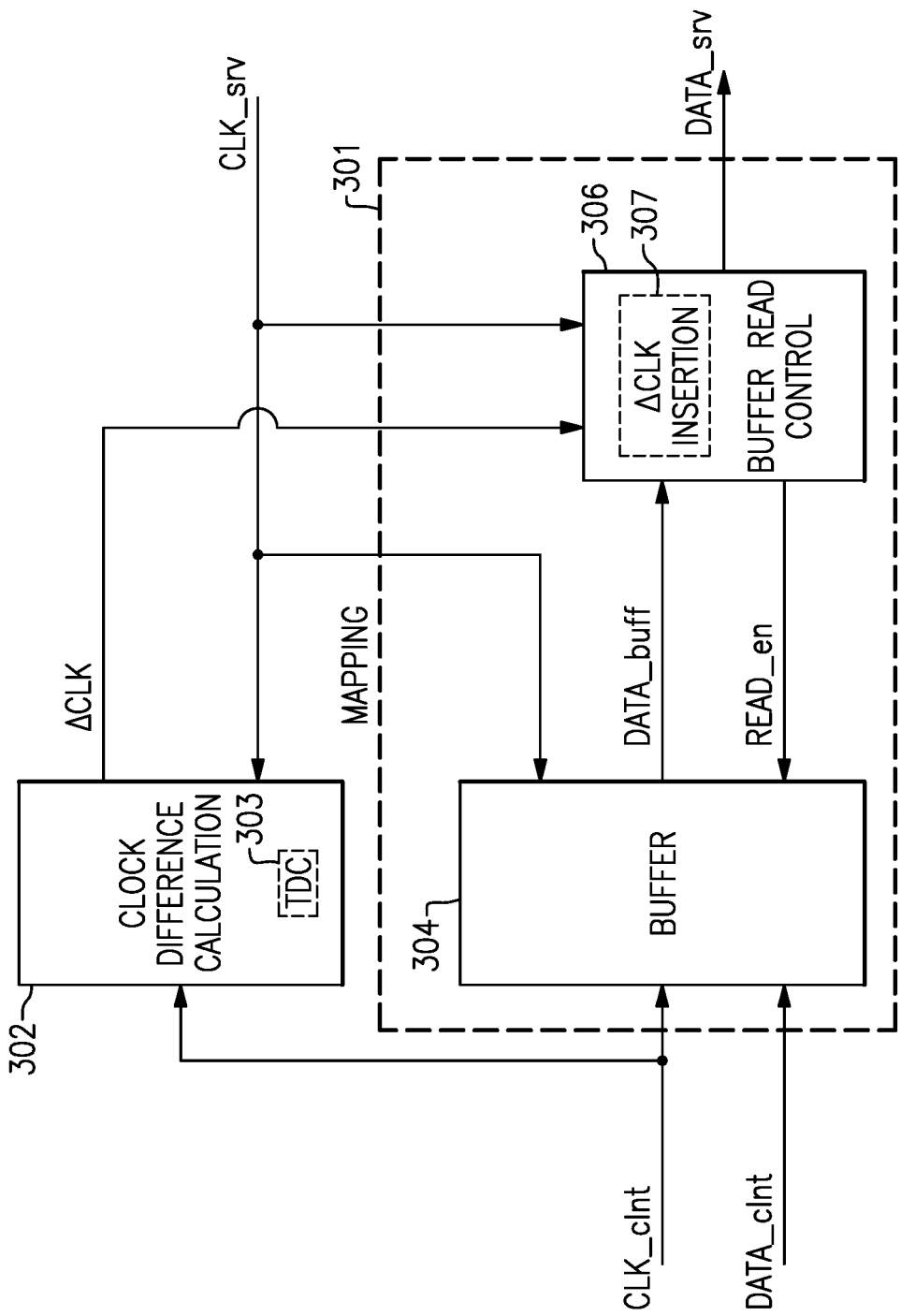
FIG. 3 is a schematic diagram of one embodiment of a clock difference calculation circuit and a mapping circuit for a server of a transport network.

FIG. 3 is a schematic diagram of one embodiment of a clock difference calculation circuit 302 and a mapping circuit 301 for a server of a transport network.

As shown in FIG. 3, the clock difference calculation circuit 302 receives a client clock signal CLK_clnt and a server clock signal CLK_srv. Additionally, the clock difference calculation circuit 302 includes at least one TDC 303 operable to generate clock difference data ΔCLK corresponding to a digital representation of a time difference between the server clock signal CLK_srv and the client clock signal CLK_clnt.

The mapping circuit 301 receives the server clock signal CLK_srv, the client clock signal CLK_clnt, the client data signal DATA_clnt, and the clock difference data ΔCLK. The mapping circuit 301 maps the client clock signal CLK_clnt and the client data signal DATA_clnt into a server data stream DATA_srv based on timing of the server clock signal CLK_srv. The server data stream DATA_srv can also be referred to herein as a server signal. As will be described in detail further below, the mapping circuit 301 also inserts the clock difference data ΔCLK into the server data stream DATA_srv.

Although one set of client clock and data signals is illustrated in FIG. 3, a mapping circuit can receive clock and data signals from multiple clients. Additionally, one or more additional clock difference calculation circuits can be included to generate clock difference data for each client.

In the illustrated embodiment, the mapping circuit 301 includes an asynchronous mapping buffer 304 and a buffer read control circuit 306. As shown in FIG. 3, the asynchronous mapping buffer 304 receives the client clock signal CLK_clnt, the client data signal DATA_clnt, and the server clock signal CLK_srv. The asynchronous mapping buffer 304 further receives a read enable signal READ_en from the buffer read control circuit 306, and provides a buffered data signal DATA_buff to the buffer read control circuit 306.

The asynchronous mapping buffer 304 is used to buffer data received via the client data signal DATA_clnt. Additionally, the read enable signal READ_en controls reading of data from the asynchronous mapping buffer 304. In certain configurations, the asynchronous mapping buffer 304 is implemented as a first in first out (FIFO) buffer. The asynchronous mapping buffer 304 provides asynchronous clock domain transformation, thereby retiming the client data signal DATA_clnt. For example, the buffered data signal DATA_buff can correspond to a retimed representation of the client data signal DATA_clnt.

As shown in FIG. 3, the buffer read control circuit 306 receives the buffered data signal DATA_buff, the server clock signal CLK_srv, and the clock difference data ΔCLK. The buffer read control circuit 306 generates the server data stream DATA_srv based on data read from the asynchronous buffer 304. The buffer read control circuit 306 also includes a clock difference data insertion circuit 307, which inserts the clock difference data ΔCLK into the server data stream DATA_srv.

Transitions of the server data stream DATA_srv are based on timing of the server clock signal CLK_srv. Thus, the server data stream DATA_srv includes both server clock and data information. In certain implementations, the buffer read control circuit 306 generates the server data stream DATA_srv in a format including data frames. Additionally, the clock difference data ΔCLK is inserted in the frame overhead by the clock difference data insertion circuit 307, and is used downstream to improve accuracy of recovering client information.

The clock difference calculation circuit 302 includes at least one TDC 303 operable to generate the clock difference data ΔCLK. Thus, the clock difference calculation circuit 302 provides a TDC-based measurement of the time difference between the client clock signal CLK_clnt and the server clock signal CLK_srv, which have an asynchronous timing relationship. In certain implementations, the clock difference calculation circuit 302 is implemented on a separate module or chip relative to server circuitry used for mapping. However, other implementations are possible.

Using a TDC-based clock difference calculation circuit 302 to generate the clock difference data ΔCLK provides high measurement precision, such as a resolution of 10 picoseconds or finer. The high accuracy measurements in turn lead to enhanced downstream reconstruction of client information, higher transport network bandwidth, downstream compensation of clock instability and inaccuracy, and/or a larger number of permissible hops in the transport network.

In contrast, transport network servers that use an adapted clock signal to provide asynchronous mapping may provide insufficient performance. For example, an upstream buffer can provide asynchronous mapping by adapting the frequency difference between the client clock signal and the server clock signal. Additionally, a downstream buffer can store client data extracted from a server data signal transported from upstream, and a downstream PLL can be tuned by a fill level of the downstream buffer to generate a buffer read clock signal corresponding to the recovered client clock signal. However, limitations in the upstream buffer's digital circuitry can limit the accuracy of the clock measurement. For instance, when the upstream buffer operates with a maximum clock frequency of about 700 MHz, an accuracy of the clock measurement on the buffer side can be limited to about 1 ns. However, nanosecond level resolution may be unacceptable in certain applications, and can result in client clock information not being passed downstream in a timely manner.

By using the TDC-based clock difference calculation circuit 302 to generate the clock difference data ΔCLK, a high resolution measurement of the asynchronous clock difference can be obtained. In contrast, transport network servers that use an adapted clock signal to provide asynchronous mapping may recover a client clock signal with a relatively large amount of degradation, which in turn can limit a hop number in cascade and/or limit the transport network's bandwidth.

Figure 4:
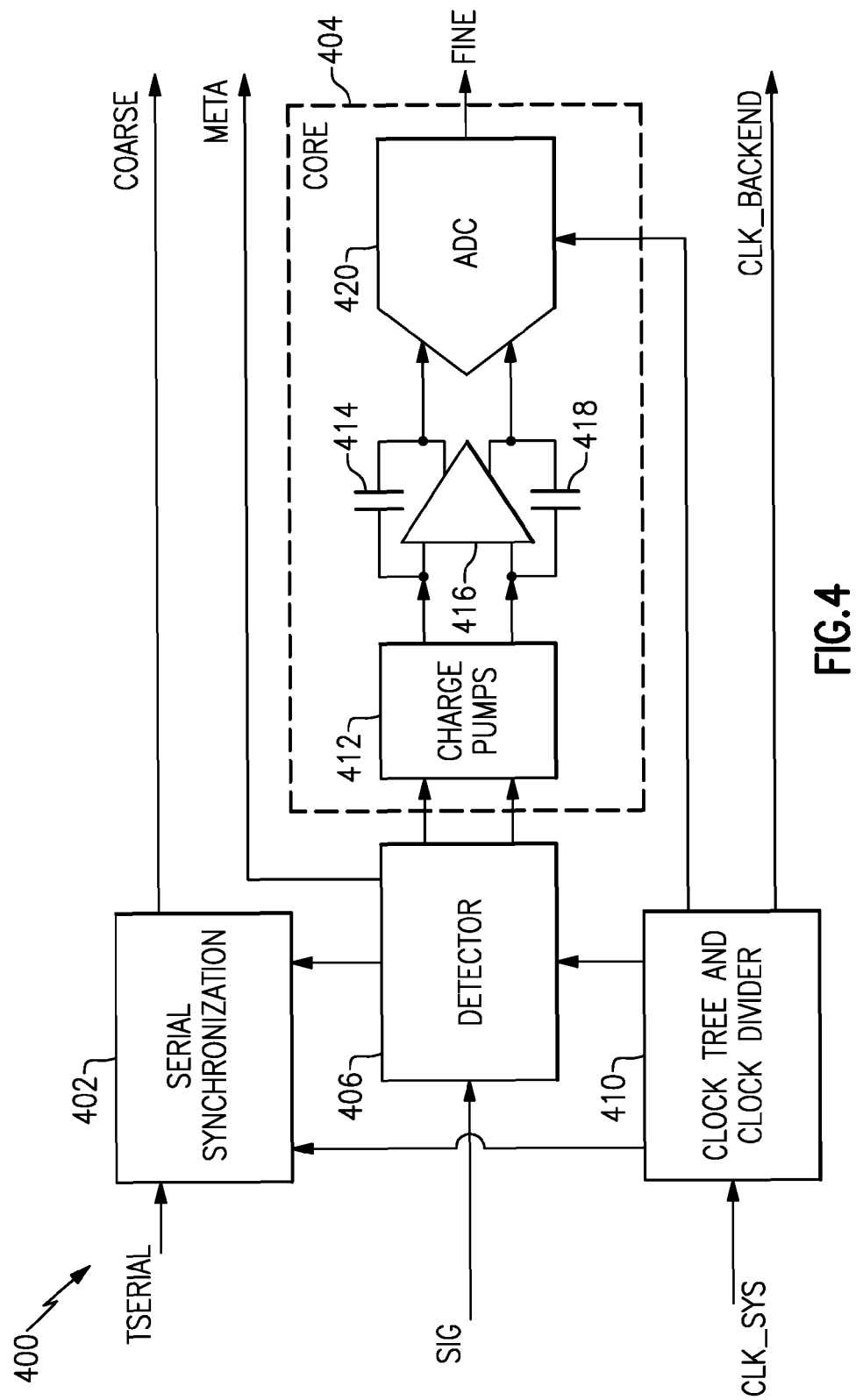
FIG. 4 is a schematic diagram of a time-to-digital converter according to one embodiment.

FIG. 4 is a schematic diagram of a time-to-digital converter 400 according to one embodiment. The TDC 400 includes a serial synchronization circuit 402, an analog measurement core 404, a detector 406, and a clock tree and clock divider circuit 410.

A TDC, such as the TDC of FIG. 4, is used to generate a digital representation of a time at which at event occurred, such as a transition of an input clock signal. For example, a TDC can generate digital timestamps or time labels that digitally represent the time instance at which the event occurred. Furthermore, in certain configurations, a TDC is used to measure a time interval between events. As persons having ordinary skill in the art will appreciate, a TDC can operate with a wide variety of time references and can be initialized in many ways.

Although one specific implementation of a TDC is shown in FIG. 4, the teachings herein are applicable to TDCs implemented in a wide variety of ways. Accordingly, other implementations of a TDC can be included in a TDC-based clock difference calculation circuit.

In the illustrated embodiment, the clock tree and clock divider circuit 410 receives a system clock CLK_SYS. The clock tree and clock divider circuit 410 can divide, buffer, and/or otherwise process the system clock CLK_SYS to generate one or more clock signals for the serial synchronization circuit 402, the analog measurement core 404, and/or the detector 406. In the illustrated embodiment, the clock tree and clock divider circuit 410 further outputs a backend clock CLK_BACKEND, which can be used for backend processing.

The detector 406 receives an input signal SIG, and can be used to detect input signal transitions, such as rising and/or falling edges of the input signal SIG. The detector 406 generates detection signals for the serial synchronization circuit 402 and the analog measurement core 404 based on observing transitions of the input signal SIG. The detection signals are in turn used by the synchronization circuit 402 and the analog measurement core 404 to generate a coarse digital output signal COARSE and a fine digital output signal FINE, respectively.

Thus, the illustrated embodiment provides a digital output signal that includes both a coarse component and a fine component, which enhances the dynamic range of the TDC 400 and permits the TDC 400 to generate digital timestamps representing events occurring over a relatively long timespan. In one example, the coarse digital output signal COARSE represents an integer number of cycles of the system clock signal CLK_SYS, and the fine digital output signal FINE represents a fractional number of cycles of the system clock signal CLK_SYS. However, other implementations are possible, including, but not limited to, TDCs that generate a digital output signal without coarse and fine components.

In the illustrated embodiment, the detector 406 provides metadata META for use in downstream processing.

With continuing reference to FIG. 4, the analog measurement core 404 is implemented using analog-based circuitry, which can provide enhanced resolution relative to digital circuitry, such as a resolution on the order of picoseconds rather than on the order of nanoseconds. The analog measurement core 404 includes charge pumps 412, a differential amplifier 416, a first integration capacitor 414, a second integration capacitor 418, and an analog-to-digital converter (ADC) 420. The detector 406 generates detection signals that control timing of measurements performed by the analog measurement core 404.

The differential amplifier 416 operates with the integration capacitors 414, 418 to integrate currents provided from the charge pumps 412. Additionally, the differential amplifier 416 provides an integrated differential signal to the ADC 420, which generates a digital representation of the integrated differential signal.

The serial synchronization circuit 402 receives a serial input signal TSERIAL, which can be used to initialize the TDC 400 and/or control other processing. The serial synchronization circuit 402 receives one or more clock signals from the clock tree and clock divider circuit 410 and one or more detection signals from the detector 406, which are processed to generate the coarse digital output signal COARSE.

Although one specific implementation of a TDC is shown in FIG. 4, the teachings herein are applicable to TDCs implemented in a wide variety of ways.

Figure 5:
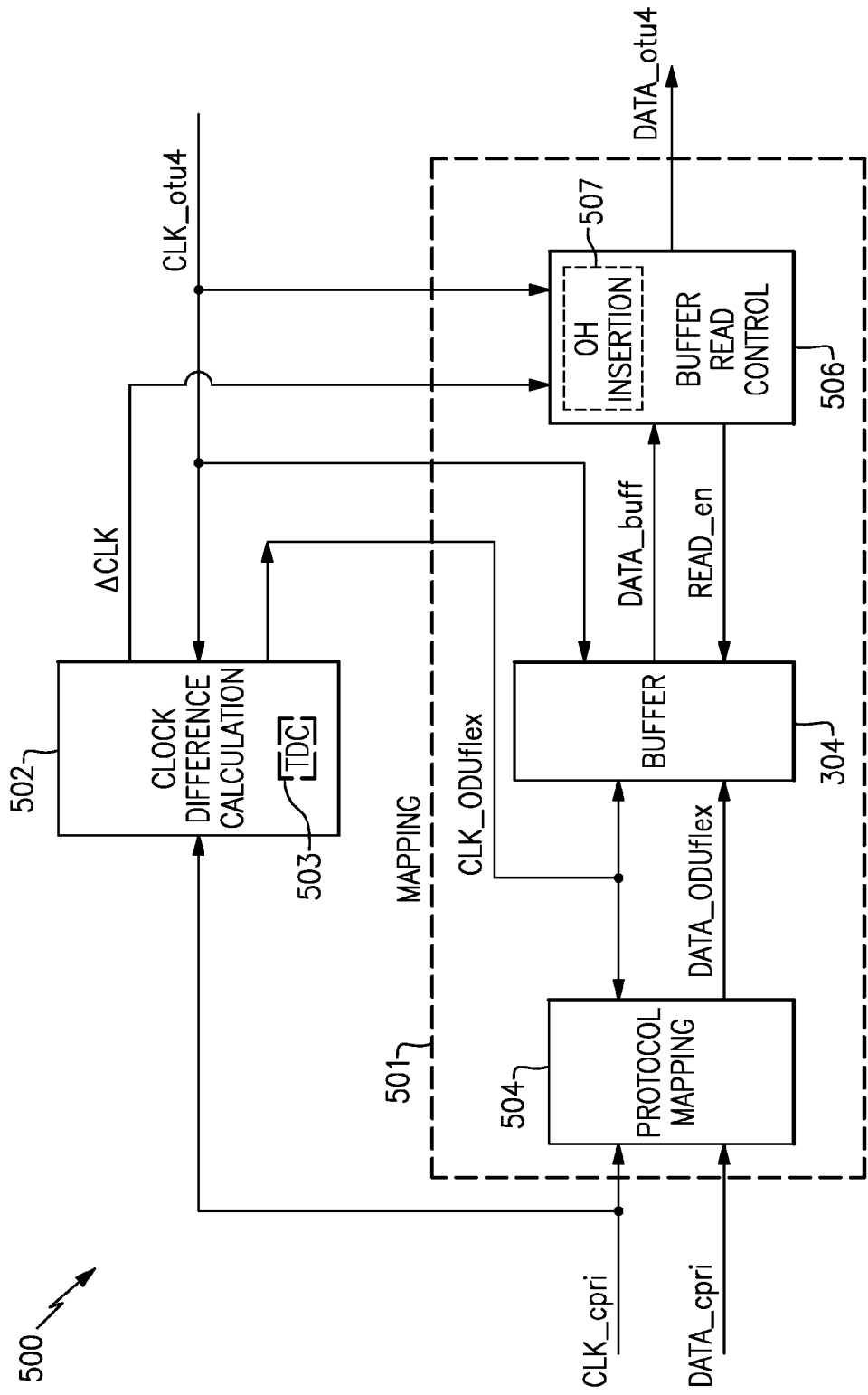
FIG. 5 is a schematic diagram of another embodiment of a clock difference calculation circuit and a mapping circuit for a server of a transport network.

FIG. 5 is a schematic diagram of another embodiment of a clock difference calculation circuit 502 and a mapping circuit 501 for a server of a transport network.

In the illustrated embodiment, the mapping circuit 501 is used to map wireless radio information to Optical Transport Unit (OTU) frames suitable for transmission over an OTN network. In particular, in this embodiment, Common Public Radio Information (CPRI) received from a client is initially transformed to flexible rate Optical Data Unit (ODUflex) via a protocol mapping, and thereafter mapped to OTU-4. However, the teachings herein are applicable to asynchronous clock mapping in a wide variety of applications and contexts.

As shown in FIG. 5, the clock difference calculation circuit 502 receives a CPRI client clock signal CLK_cpri and an OTU-4 server clock signal CLK_otu4. Additionally, the clock difference calculation circuit 502 includes at least one TDC 503 operable to generate clock difference data $\Delta$CLK corresponding to a digital representation of a time difference between the OTU-4 server clock signal CLK_otu4 and the CPRI client clock signal CLK_cpri.

The clock difference calculation circuit 502 also generates an ODUflex clock signal CLK_ODUflex, which is used for protocol mapping between client CPRI information and ODUflex. In one embodiment, the clock difference calculation circuit 502 generates the ODUflex clock signal CLK_ODUflex using a PLL.

Although the clock difference calculation circuit 502 generates the ODUflex clock signal CLK_ODUflex in the illustrated embodiment, other implementations are possible. For example, in another implementation, the ODUflex clock signal CLK_ODUflex corresponds to a gapped clock signal that is digitally transformed from the OTU-4 server clock signal CLK_otu4. For example, the OTU-4 server clock signal CLK_otu4 can have a higher frequency than the ODUflex clock signal CLK_ODUflex, and digital circuitry can generate the ODUflex clock signal CLK_ODUflex based on processing the OTU-4 server clock signal CLK_otu4 to remove an appropriate number of clock pulses to generate the gapped clock signal.

The mapping circuit 501 receives the OTU-4 server clock signal CLK_otu4, the CPRI client clock signal CLK_cpri, the CPRI client data signal DATA_cpri, the ODUflex clock signal CLK_ODUflex, and the clock difference data $\Delta$CLK. The mapping circuit 501 performs a protocol mapping of the client information from CPRI to ODUflex. In accordance with the ITU-T G.709 protocol, the CPRI Option 8 signal maps into ODUflex by an initial bit-synchronous mapping procedure (BMP), and the ODUflex signal is synchronous to the CPRI Option 8 signal that it is generated from. The mapping circuit 501 maps the ODUflex data signal DATA_ODUflex and the ODUflex clock signal CLK_ODUflex into an OTU-4 server data stream DATA_otu4 based on timing of the OTU-4 server clock signal CLK_otu4. The OTU-4 server data stream DATA_otu4 includes frames including data representing the client CPRI information and overhead including the clock difference data $\Delta$CLK.

In the illustrated embodiment, the mapping circuit 501 includes an asynchronous mapping buffer 304, a protocol mapping circuit 504, and a buffer read control circuit 506. As shown in FIG. 5, the protocol mapping circuit 504 provides a mapping from CPRI to ODUflex. Additionally, the asynchronous mapping buffer 304 receives the ODUflex clock and data signals, and provides a buffered data signal DATA_buff to the buffer read control circuit 506. The asynchronous mapping buffer 304 receives a read enable signal READ_en from the buffer read control circuit 506, which controls reading from the asynchronous mapping buffer 304.

As shown in FIG. 5, the buffer read control circuit 506 receives the buffered data signal DATA_buff, the OTU-4 server clock signal CLK_otu4, and the clock difference data ΔCLK. The buffer read control circuit 506 generates the OTU-4 server data stream DATA_otu4 based on data read from the asynchronous buffer 304. The buffer read control circuit 506 also includes a frame overhead insertion circuit 507, which inserts the clock difference data ΔCLK into frame overhead of the OTU-4 server data stream DATA_otu4.

The illustrated embodiment is implemented for operation in OTN. In one example, the CPRI Option 8 client information has a nominal data rate of about 10.1376 Gbit/s, with a parallel data width of 64 bits and a corresponding clock frequency of about 158.4 MHz. Additionally, the ODUflex signal has a nominal data rate of about 10.1376 Gbit/s*239/238, with a parallel data width of 64 bits and a corresponding clock frequency of about 159.066 MHz. In the illustrated embodiment, the ODUflex signal is adapted in 8 time slots of the OTU-4 payload (hereinafter ODTU4.8). Additionally, the OTU-4 server data stream DATA_otu4 has a nominal data rate of about 255/227*99.5328 Gbit/s, with a parallel data width of 640 bits and a corresponding clock frequency of about 174.703 MHz. Furthermore, a nominal data rate of ODTU4.8 is about 8*47.5/3824*239/255 times the OTU-4 data rate.

Although one specific example of data rates, data widths, and clock frequencies is provided, other values are possible.

In the mapping side, the OTU-4 signal clock and the CPRI signal clock are asynchronous. Additionally, ODUflex is asynchronously mapped into ODTU4.8, and the clock difference data ΔCLK is inserted into the overhead bits of ODTU4.8. On the de-mapping side, the OTU4 clock and data are recovered by a CDR circuit, and the clock difference data ΔCLK is also decoded from ODTU4.8 overhead. Furthermore, the ODUflex and CPRI Option 8 information is unpacked, and the client CPRI clock signal is recovered.

In one embodiment, the clock difference data ΔCLK is represented as Cm/Cnd, where Cm and Cnd are coefficients as defined by ITU-T G.709. For example, for a measurement window Cmeas for comparing a client clock signal and a server clock signal, Cm can correspond to Cmeas multiplied by a particular scaling factor, and Cnd can correspond to the accumulated remainder of Cm.

Accordingly, in certain configurations, the frame overhead insertion circuit 507 inserts clock difference data represented as a ratio of protocol coefficients defined by a communication protocol.

Figure 6:
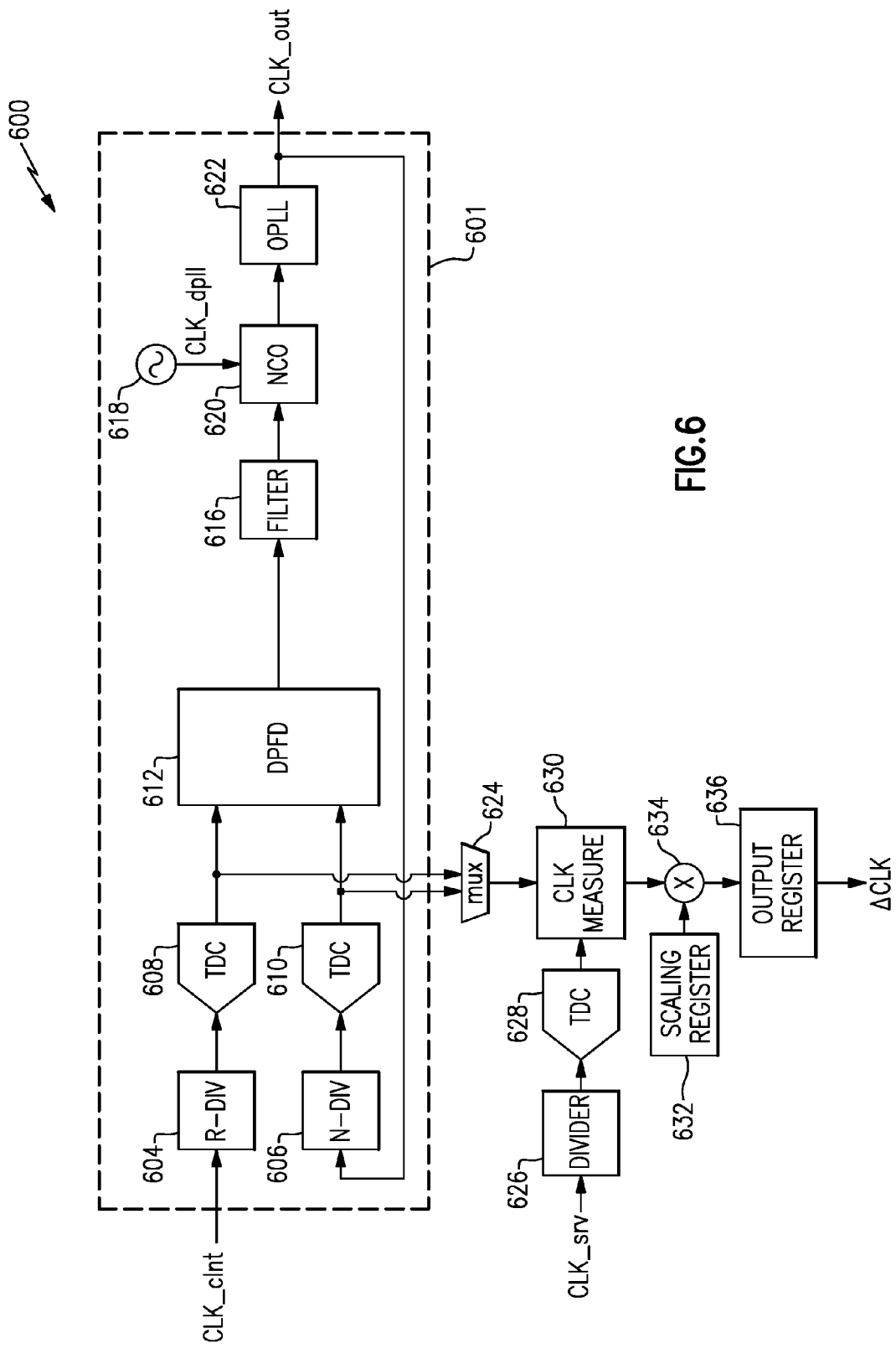
FIG. 6 is a schematic diagram of a clock difference calculation circuit according to one embodiment.

FIG. 6 is a schematic diagram of a clock difference calculation circuit 600 according to one embodiment. The clock difference calculation circuit 600 includes a client clock divider 604 (R-DIV), a feedback clock divider 606 (N-DIV), a client clock TDC 608, a feedback clock TDC 610, a digital phase and frequency detector (DPFD) 612, a digital loop filter 616, a numerical controlled oscillator 620, a digital PLL reference clock generator 618, an output PLL 622, a multiplexer 624, a server clock divider 626, a server clock TDC 628, a clock measurement circuit 630, a scaling resister 632, and an output register 636.

Although FIG. 6 illustrates one embodiment of a clock difference calculation circuit, the teachings herein are applicable to clock difference calculation circuits implemented in other ways. Accordingly, other implementations of TDC-based clock difference calculation circuits can be used.

For clarity of the figures, clock signals used to control the TDCs 608, 610, and 628 have been omitted for clarity. For example, in one embodiment, the TDCs 608, 610, and 628 each receive a common system clock signal used as a time reference for time-to-digital conversion operations.

The illustrated clock difference calculation circuit 600 includes a digital PLL 601 that generates an output clock signal CLK_out using the client clock signal CLK_clnt as a reference. In certain implementations, the output clock signal CLK_out can be used for protocol mapping. For instance, when the clock difference calculation circuit 600 is used to implemented the clock difference calculation circuit 502 of FIG. 5, the output clock signal CLK_out can serve as the ODUflex clock signal CLK_ODUflex.

The client clock divider 604 divides the client clock signal CLK_clnt by a programmable divisor R, and provides the divided client clock signal as an input to the client clock TDC 608. The client clock TDC 608 performs time-to-digital conversion of transitions of the divided client clock signal to generate digital timestamps of the client clock signal. The feedback clock divider 606 divides the output clock signal CLK_out by a programmable divisor N to generate a feedback clock signal. The feedback clock TDC 610 performs time-to-digital conversion of transitions of the feedback clock signal to generate digital timestamps of the feedback clock signal.

The DPFD 612 compares the digital timestamps of the client clock signal to the digital timestamps of the feedback clock signal to generate an error signal, which indicates a phase and/or frequency error of the digital PLL 601. The digital filter 616 digitally filters the error signal to generate a frequency control signal that controls an oscillation frequency of the NCO 620. The NCO 620 generates an NCO clock signal based on the frequency control signal and a digital PLL reference clock signal CLK_dpll provided by the digital PLL reference clock generator 618. The NCO clock signal is provided as an input reference clock to the output PLL 622. The output PLL 622 generates the output clock signal CLK_out, which is phase-locked to the NCO clock signal.

The division values of the client clock divider 604, the feedback clock divider 606, and dividers in the output PLL 622 can be selected to control the frequency of the output clock signal CLK_out relative to the frequency of the client clock signal CLK_clnt.

The server clock divider 626 divides the server clock signal CLK_srv by a programmable divisor, and provides the divided server clock signal to the server clock TDC 628. The server clock TDC 628 processes the divided server clock signal to generate digital timestamps of the server clock signal.

In the illustrated embodiment, the clock measure circuit 630 compares the digital timestamps of the server clock signal to digital timestamps chosen by the multiplexer 624. In particular, the multiplexer 624 can select between the digital timestamps of the client clock signal and the digital timestamps of the feedback clock signal. When in lock, the feedback of the digital PLL 601 can result in the input clock signals to the TDC 608 and the TDC 610 being substantially identical to one another. Accordingly, in the locked condition, the digital timestamps generated by the client clock TDC 608 and the feedback clock TDC 610 can be about the same as one another. Using the multiplexer 624 can advantageously improve performance by reducing jitter when the feedback timestamps are filtered by the digital PLL 601.

Thus, the clock measure circuit 630 compares digital timestamps of the client clock signal to digital timestamps of the server clock signal to generate clock difference data. Additionally, the clock measurement circuit 630 computes the difference between the client clock signal the server clock signal over a certain time interval, which counted by the server clock signal $CLK_{SRV}$. In essence, the clock measurement circuit 630 can count a time interval error between a client clock and a server clock. Thus, it's an accumulated difference in time but separated by many measurement intervals.

As shown in FIG. 6, the clock difference data generated by the clock measure circuit 630 is multiplied by a programmable scaling register 632 before being outputted via output register 636 as the clock difference data ΔCLK.

In the illustrated embodiment, the clock difference data is further scaled by the scaling register 632. The scaling register 632 serves to provide a proportion transformation. The digital scale factor can be a multiple of a scale factor determined by the ratio of an integer numerator to an integer denominator.

Using a proportion transformation helps provide the clock difference data ΔCLK on a desired time scale, thereby providing more accurate downstream recovery of client clock and data signals.

For instance, when the measured inputs are not the original signals, there are clocks which represent the client and the server signals. If the clocks are divided by the same factor, then the scale factor is unity; however, if the clocks are not divided by the same factor (divisor), then a proportion transformation can be used. When the clocks are not divided by the same factor (divisor), then this can mean the clocks have unequal clock divisors. For example, when the server signal OTU4 is 99.5328 Gbit/s*255/227, the clock CLK_otu4 (OTU4/640) is 174.703 MHz, the client 100 GbE is 103.125 Gbit/s, and the clock CLK_100 ge (100 GbE*32/33/640) is 156.25 MHz, then an additional scale factor equal to 33/32 should be added to Cmeas(N).

When the client signal indirectly maps to the server frame structure, then according to ODUflex standards, there is an intermediate signal layer. For instance, as shown in FIG. 5, when the client signal uses CPRI option 8 and the clock CLK_cpri is 158.4 MHz (10.1376 G/64), the actual signal that maps into server data can be the data rate DATA_ODUflex. In this example, the data rate DATA_ODUflex can be a factor of 239/238 higher than that of DATA_cpri. Thus, a proportion transform of 239/238 may be required.

In this way a programmable scaling register is used to make corrections to a fixed clock divisor ratio in a given scenario where there are unequal clock divisors from the measurements of two clock signals instead of real or actual server signals and/or client signals which map to the server frame.

Figure 7:
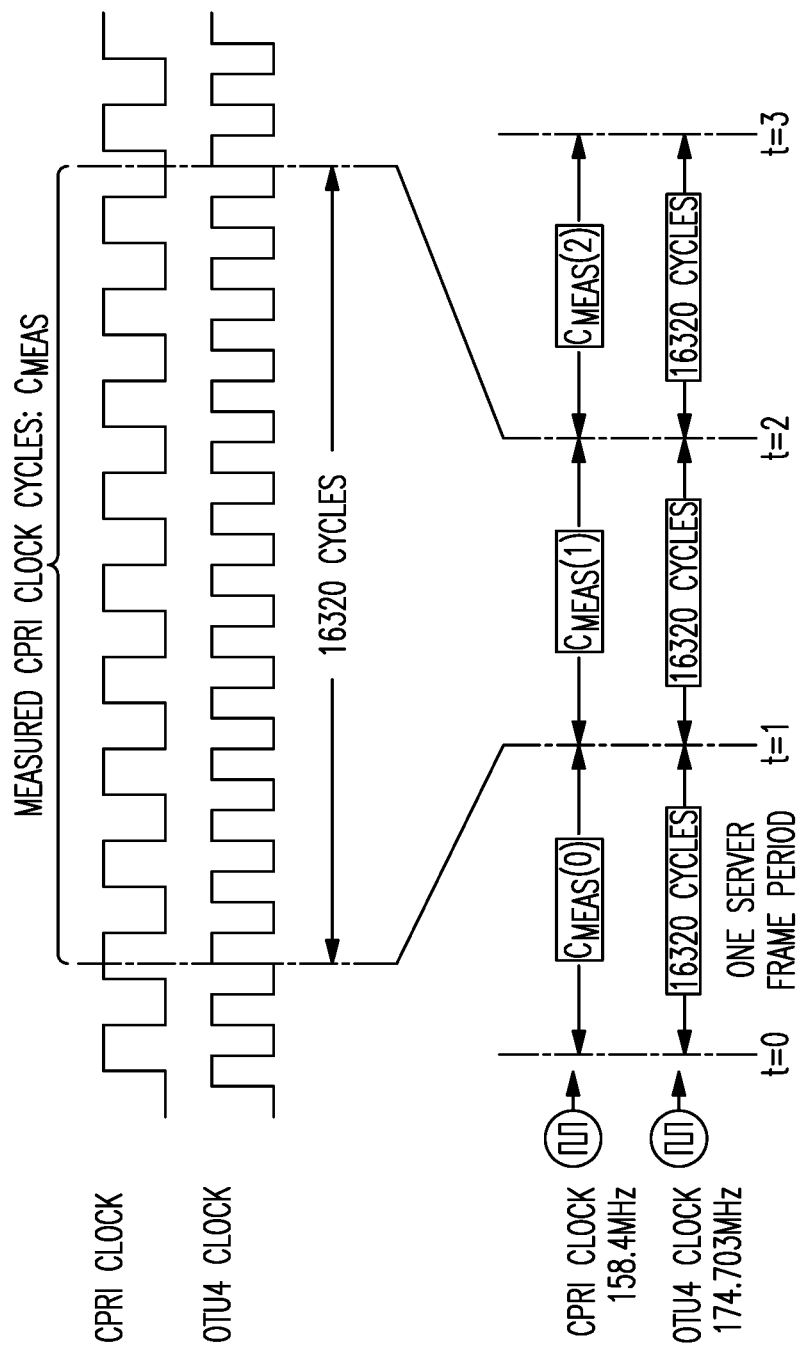
FIG. 7 is a timing diagram showing one example of a clock measurement interval for a clock difference calculation circuit.

FIG. 7 is a timing diagram 700 showing one example of a clock measurement interval for a clock difference calculation circuit The timing diagram 700 compares an associated client data clock CLK_cpri with a server clock CLK_otu4. The client data clock CLK_cpri and the server clock CLK_otu4 can correspond to clock signals for one implementation of the embodiment of FIG. 5.

In the example shown in FIG. 7, CPRI Option 8 client information has a nominal data rate of about 10.1376 Gbit/s, with a parallel data width of 64 bits and a corresponding clock frequency of about 158.4 MHz. Additionally, the ODUflex signal has a nominal data rate of about 10.1376 Gbit/s*239/238, with a parallel data width of 64 bits and a corresponding clock frequency of about 159.066 MHz. Furthermore, the OTU-4 server data stream DATA_otu4 has a nominal data rate of about 255/227*99.5328 Gbit/s, with a parallel data width of 640 bits and a corresponding clock frequency of about 174.703 MHz.

For the illustrated example, each clock measurement time period is 80 by OTU4 frame period, which corresponds to about 16,320 OUT-4 parallel clock (174.703 MHz) periods. As shown in FIG. 7, the measurement time (Cmeas) corresponds to the CPRI parallel clock period numbers in a measurement period (16,320 by OTU4 parallel clock periods). The accuracy can be to within a few picoseconds.

In the example shown in FIG. 7, measurements are conducted during each server frame period. The quantity measured is a number of clock cycles of the client data clock CLK_cpri during the frame period, where one server frame period corresponds to 16,320 cycles of the OUT-4 server clock signal CLK_otu4. A TDC-based clock difference calculation circuit can be used to perform the measurements. In this example, the duration of each measurement is one OUT-4 multi-frame period. Measurements are continuously made in succession to measure the differences between the server clock CLK_otu4 and the client data clock CLK_cpri.

In this example, the clock difference data can be stored as a digital quantity $C_{MEAS}(N)$ where N is an integer indicating the frame period. The results of $C_{MEAS}(N)$ are sent to a mapping circuit for insertion into frame overhead after a certain proportion transformation is applied.

Applications

Devices employing the above described schemes can be implemented into various electronic devices. Examples of the electronic devices can include, but are not limited to, consumer electronic products, parts of the consumer electronic products, electronic test equipment, etc. Examples of the electronic devices can also include circuits of optical networks or other communication networks. The consumer electronic products can include, but are not limited to, a portable audio device, an MP3 player, a smartphone, a mobile phone, a powered headphone, an automobile, a camcorder, a camera, a digital camera, a portable memory chip, a washer, a dryer, a washer/dryer, a copier, a facsimile machine, a scanner, a multifunctional peripheral device, etc. Further, the electronic device can include unfinished products, including those for industrial, medical and automotive applications.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims. Current rating can be defined by design and by specification.

What is claimed is:

1. A server for transmitting data over a transport network, the server comprising:
   a clock generator configured to generate a server clock signal;
   a mapping circuit configured to receive a client data signal and a client clock signal that is asynchronous with respect to the server clock signal, the mapping circuit further configured to map the client clock signal and the client data signal into a server data stream based on timing of the server clock signal; and
   a clock difference calculation circuit comprising at least one time-to-digital converter (TDC) configured to generate a first plurality of digital timestamps representing a plurality of transitions of the client clock signal and to generate a second plurality of digital timestamps representing a plurality of transitions of the server clock signal, the clock difference calculation circuit configured to generate clock difference data comprising a digital representation of a time difference between the server clock signal and the client clock signal based on the first plurality of digital timestamps and on the second plurality of digital timestamps, the mapping circuit further configured to insert the clock difference data into the server data stream.

2. The server of claim 1, the server data stream comprising a frame, and the mapping circuit configured to include the clock difference data in an overhead portion of the frame.

3. The server of claim 2, the clock difference calculation circuit further configured to measure the time difference between the server clock signal and the client clock signal over about a time period of the frame.

4. The server of claim 1, the clock difference calculation circuit comprising a scaling unit configured to scale the clock difference data by a scale factor.

5. The server of claim 1, the at least one TDC comprising a first TDC that generates the first plurality of digital timestamps and a second TDC that generates the second plurality of digital timestamps.

6. The server of claim 1, the clock difference calculation circuit further configured to generate the clock difference data based on aggregating a difference between the first plurality of the timestamps and the second plurality of timestamps.

7. The server of claim 5, the clock difference calculation circuit comprising a phase-locked loop in which the first TDC operates in.

8. The server of claim 1, the clock difference calculation circuit configured to generate an output clock signal based on the client clock signal, and the mapping circuit comprising a protocol mapper configured to provide a bit-synchronous mapping of the client data signal from a time domain of the client clock signal to a time domain of the output clock signal.

9. The server of claim 1, the mapping circuit comprising an asynchronous mapping buffer that generates a buffered data signal based on asynchronously mapping the client data signal, and a buffer read control circuit that generates the server data stream based on the buffered data signal, the clock difference data, and the timing of the server clock signal.

10. An asynchronous clock mapping circuit comprising:
    a clock difference calculation circuit comprising at least one time-to-digital converter (TDC) configured to generate a first plurality of digital timestamps representing a plurality of transitions of a client clock signal and to generate a second plurality of digital timestamps representing a plurality of transitions of a server clock signal, the clock difference calculation circuit configured to generate clock difference data comprising a digital representation of a time difference between the server clock signal and the client clock signal based on the first plurality of digital timestamps and on the second plurality of digital timestamps; and
    a mapping circuit configured to generate a server data stream based on asynchronously mapping a client data signal from a time domain of the client clock signal to a time domain of the server clock signal, the mapping circuit further configured to insert the clock difference data into the server data stream.

11. The asynchronous clock mapping circuit of claim 10, the server data stream comprising a frame, and the mapping circuit configured to include the clock difference data in an overhead portion of the frame.

12. The asynchronous clock mapping circuit of claim 11, the clock difference calculation circuit further configured to measure the time difference between the server clock signal and the client clock signal over about a time period of the frame.

13. The asynchronous clock mapping circuit of claim 10, the clock difference calculation circuit comprising a scaling unit configured to scale the clock difference data by a scale factor.

14. The asynchronous clock mapping circuit of claim 10, the at least one TDC comprising a first TDC that generates the first plurality of digital timestamps and a second TDC that generates the second plurality of digital timestamps.

15. The asynchronous clock mapping circuit of claim 10, the clock difference calculation circuit further configured to generate the clock difference data based on aggregating a difference between the first plurality of the timestamps and the second plurality of timestamps.

16. The asynchronous clock mapping circuit of claim 14, the clock difference calculation circuit comprising a phase-locked loop in which the first TDC operates in.

17. The asynchronous clock mapping circuit of claim 10, the clock difference calculation circuit configured to generate an output clock signal based on the client clock signal, and the mapping circuit comprising a protocol mapper configured to provide a bit-synchronous mapping of the client data signal from a time domain of the client clock signal to a time domain of the output clock signal.

18. The asynchronous clock mapping circuit of claim 10, the mapping circuit comprising an asynchronous mapping buffer that generates a buffered data signal based on asynchronously mapping the client data signal, and a buffer read control circuit that generates the server data stream based on the buffered data signal, the clock difference data, and the timing of the server clock signal.

19. A method of transporting data over a transport network, the method comprising:
    generating a first plurality of digital timestamps representing a plurality of transitions of a client clock signal and a second plurality of digital timestamps representing a plurality of transitions of a server clock signal using at least one time-to-digital converter (TDC);
    generating clock difference data comprising a digital representation of a time difference between the server clock signal and the client clock signal based on the first plurality of digital timestamps and on the second plurality of digital timestamps;

generating a server data stream based on asynchronously mapping a client data signal from a time domain of the client clock signal to a time domain of the server clock signal; and inserting the clock difference data into the server data stream for transmission downstream.

20. The method of claim 19, further comprising including the clock difference data in an overhead portion of a frame of the server data stream.

\* \* \* \* \*